United States Patent [19]

McCambridge et al.

[11] Patent Number: 5,479,333

[45] Date of Patent: Dec. 26, 1995

[54] POWER SUPPLY START UP BOOSTER CIRCUIT

[75] Inventors: John M. McCambridge, Northville; David A. Wagner, Goodrich, both of Mich.

[73] Assignee: Chrysler Corporation, Highland Park, Mich.

[21] Appl. No.: 232,551

[22] Filed: Apr. 25, 1994

[51] Int. Cl.$^6$ .................................................. H02P 13/22
[52] U.S. Cl. .............................. 363/49; 323/222; 323/901
[58] Field of Search ................................. 323/211, 222, 323/283, 205, 207, 224, 901; 361/154, 152, 153, 155; 363/20–21, 61, 97, 49

[56] References Cited

U.S. PATENT DOCUMENTS

| | | | |
|---|---|---|---|
| 4,549,254 | 10/1986 | Kissel | 363/21 |
| 4,631,628 | 12/1986 | Kissel | 361/154 |
| 4,639,659 | 1/1987 | Okanobu | 323/224 |
| 4,899,256 | 2/1990 | Sway-Tin | 361/386 |
| 4,916,379 | 4/1990 | Wand et al. | 323/222 |
| 4,920,532 | 4/1990 | Wroblewski | 307/85.1 |
| 5,134,355 | 7/1992 | Hastings | 323/211 |
| 5,151,647 | 9/1992 | Frantz | 323/222 |

Primary Examiner—Peter S. Wong
Assistant Examiner—Aditya Krishnan
Attorney, Agent, or Firm—Mark P. Calcaterra

[57] ABSTRACT

A power supply start up booster circuit for providing an increased startup voltage for a switch mode control integrated circuit including a boost portion for combining a first input voltage that has a predetermined minimum value and a second input voltage that transitions from 0 volts to the predetermined minimum value to make a minimum threshold voltage, a control portion having an integrated circuit for using the minimum threshold voltage to temporarily provide a voltage input at the integrated circuit, and an output portion for providing a permanent voltage input at the integrated circuit and an output supply voltage to an external circuit.

15 Claims, 1 Drawing Sheet

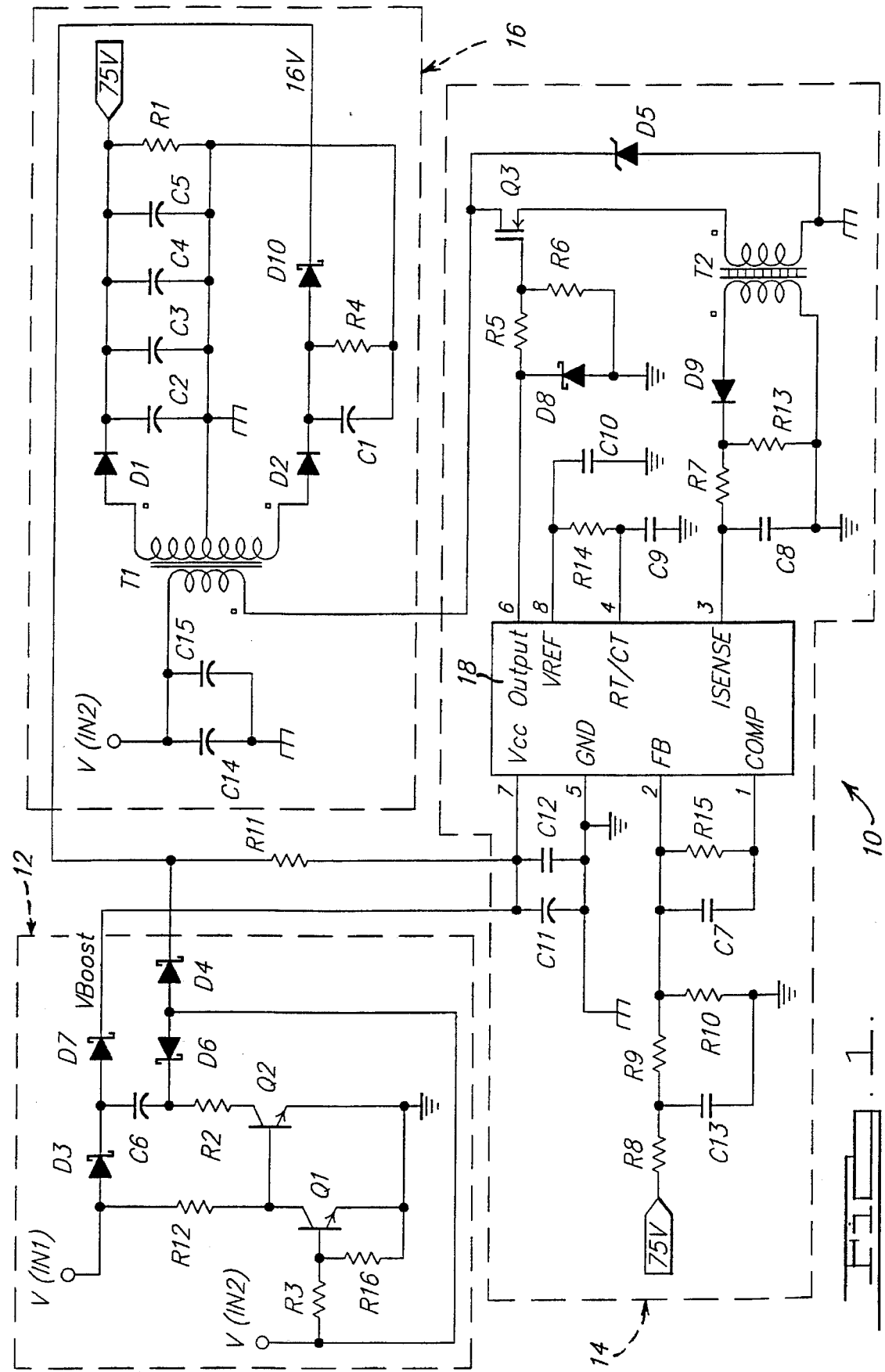

POWER SUPPLY START UP BOOSTER CIRCUIT

BACKGROUND OF THE INVENTION

1. Field of the Invention

The present invention relates generally to power supply circuits and, more particularly, to a power supply start up booster circuit for an automotive vehicle.

2. Description of the Related Art

In low source voltage applications such as in an automotive vehicle, the voltage from a battery in the automotive vehicle may be too low to start a switching control integrated circuit (IC). Thus, there is a need in the art to provide a circuit which uses a low battery voltage and a switched voltage that indicates when to turn on the power supply.

SUMMARY OF THE INVENTION

It is, therefore, one object of the present invention to provide a start up booster circuit for a power supply in an automotive vehicle.

It is another object of the present invention to provide a start up booster circuit for a switch mode power supply.

It is yet another object of the present invention to provide a power supply start up booster circuit that eliminates the use of costly voltage converters.

To achieve the foregoing objects, the present invention is a power supply start up booster circuit for providing an increased startup voltage for a switch mode control integrated circuit including boost means for combining a first input voltage that has a predetermined minimum value and a second voltage input that transitions from 0 volts to the predetermined minimum value to make a minimum threshold voltage. The circuit also includes control means having an integrated circuit for using the minimum threshold voltage to temporarily provide a voltage input at the integrated circuit. The circuit further includes output means for providing a permanent voltage input at the integrated circuit and an output supply voltage to an external circuit.

One advantage of the present invention is that a start up booster circuit is provided for a switch mode power supply in an automotive vehicle. Another advantage of the present invention is that the power supply start up booster circuit uses standard switch mode ICs for low voltage uses, without costly voltage converters. Yet another advantage of the present invention is that a low cost power supply start up booster circuit is provided for an automotive vehicle.

Other objects, features and advantages of the present invention will be readily appreciated as the same becomes better understood after reading the subsequent description taken in conjunction with the accompanying drawing.

BRIEF DESCRIPTION OF THE DRAWING

FIG. 1 is a circuit diagram of a power supply start up booster circuit according to the present invention.

DESCRIPTION OF THE PREFERRED EMBODIMENT(S)

Referring to FIG. 1, a power supply start up booster circuit 10, according to the present invention, is shown for use in an automotive vehicle (not shown). The circuit 10 includes a boost portion, generally indicated at 12, a control IC portion, generally indicated at 14, and an output portion, generally indicated at 16.

The boost portion 12 includes transistors Q1 and Q2, resistors R2, R3, R12 and R16, diodes D3, D4, D6, and D7, and capacitor C6. The resistors R12 and R2 are connected to collectors of the transistors Q1 and Q2, respectively. The transistors Q1 and Q2 have their emitters connected to ground. The capacitor C6 is connected to the collector of the transistor Q2 through the resistor R2. The collector of the transistor Q1 and the base of transistor Q2 are connected to a voltage input V(IN1) through the resistor R12. The voltage input V(IN1) is also connected to the anode of the diode D3. The cathode of the diode D3 is connected to the anode of the diode D7 as well as to the capacitor C6. A second voltage input V(IN2) is connected to the base of the transistor Q1 through a voltage divider formed by the resistors R3 and R16. The voltage input V(IN2) is also connected to the anodes of the diodes D4 and D6. The cathode of the diode D6 is connected to the resistor R2, while the cathode of the diode D4 provides an output to the output portion 16 and to the control IC portion 14 through a resistor R11. The resistor R11 is used to provide both a one (1) volt drop and a low pass filter from a sixteen (16) volt winding of a transformer T1 to be described to the input to the control IC portion 14. The cathode of the diode D7 also provides an output $V_{Boost}$ to the control IC portion 14.

The control IC portion 14 includes an IC 18, capacitors C7, C8, C9, C10, C11, C12 and C13, resistors R5, R6, R7, R8, R9, R10, R13, R14 and R15, diodes D5, D8 and D9, transistor Q3 and transformer T2. The capacitors C11 and C12 are connected in parallel between pin 7 (voltage input VCC) and pin 5 (ground) of the IC 18. The capacitor C11 is also connected to the diode D7 of the boost portion 12 and the capacitor C12 is also connected to the boost portion 12 through the resistor R11. The capacitor C7 and resistor R15 are connected in parallel between pin 2 (FB) and pin 1 (COMP) of the IC 18. The resistor R10 is connected between ground and pin 2 (FB) of the IC 18. The resistor R9 is connected from pin 2 (FB) of the IC 18 to the resistor R8. The capacitor C13 is connected between ground and the junction of the resistors R8 and R9. A seventy-five volt (75 V) source is connected to the resistor R8.

The resistor R14 is interconnected between pin 8 (VREF) and pin 4 (RT/CT) of the IC 18 and the capacitor C9 is connected between pin 4 (RT/CT) and ground. The capacitor C10 is connected in parallel to the series combination of resistor R14 and capacitor C9. The transformer T2 has a secondary side connected to pin 3 (ISENSE) of the IC 18 through the diode D9 and the resistor R7 which are connected in series. The secondary side of the transformer T2 is also connected to ground. The control IC portion 14 also includes a path to ground through the resistor R13 which is connected between the resistor R7 and the diode D9. The control IC portion 14 further includes a path to ground through the capacitor C8 from pin 3 (ISENSE) of the IC 18. The mosfet transistor Q3 has its source connected to the primary side of the transformer T2 which is also connected to ground. The gate of the mosfet transistor Q3 is connected to pin 6 (output) of the IC 18 through a resistor R5. Pin 6 and the base of the mosfet transistor Q3 also have paths to ground through the diode D8 and the resistor R6, respectively. The drain of the mosfet transistor Q3 is connected to the output portion 16 to be described. The control IC portion 14 further includes a path to ground from the drain of the mosfet transistor Q3 through the diode D5.

The output portion 16 includes a transformer T1, capacitors C1, C2, C3, C4, C5, C14 and C15, resistors R1 and R4, diodes D1, D2 and D10. The primary side of the transformer T1 is connected to the drain of the mosfet transistor Q3 of the control IC portion 14 and to the second voltage input V(IN2). The capacitors C14 and C15 provide parallel paths from the second voltage input V(IN2) to ground and are connected to the primary side of the transformer T1. The diodes D2 and D10 are connected to the secondary side of the transformer T1 and to the boost portion 12. The diode D10 blocks any feedback from the second voltage input V(IN2) into the parallel combination of the capacitor C1 and resistor R4. The diode D1 interconnects the secondary side of the transformer T1 and the seventy-five volt (75 V) output. The capacitor C1 and resistor R4 are connected in parallel between the diodes D2 and D10 and ground. The resistor R1 is connected between the 75 V output and ground. The capacitors C2, C3, C4 and C5 are connected in parallel between the cathode of the diode D1 and ground.

In operation, V(IN1) and V(IN2) are present at the circuit 10 and at their minimum value of six (6) volts and zero (0) volts, respectively. This causes the transistor Q1 to turn OFF and provide a turn ON voltage to the base of the transistor Q2. As a result, a path is established that allows the charging of the capacitor C6 from V(IN1) through the diode D3, capacitor C6, resistor R2 and transistor Q2. The capacitor C6 will charge to a voltage with respect to ground of V(IN1)−$V_{fd}$. $V_{fd}$ is the forward voltage drop across the Schottky diode D3, which is typically 0.3 volts. The diode D3 prevents current flow to V(IN1) from the capacitor C6. Also, the diode D6, connected between V(IN2) and the capacitor C6, prevents current flow from a negative side of the capacitor C6 to V(IN2).

When V (IN2) transitions from 0 volts to its minimum value of 6 volts, the transistor Q1 turns ON and sends a turn OFF voltage to the base of the transistor Q2, turning the transistor Q2 OFF. This floats the negative side of the capacitor C6. The 6 volts from V(IN2) is then passed into the anode of the diode D6. The cathode of diode D6 then connects to the negative side of the capacitor C6. This replaces the floating negative side of the capacitor C6 with V(IN2)−$V_{fd}$. Since the voltage on the capacitor C6 can not change instantaneously, the previous voltage on the capacitor C6, which is equal to V(IN1)−$V_{fd}$, is essentially added to the voltage from V(IN2). The total voltage on the capacitor C6 with respect to ground is V(IN1)−$V_{fd}$+V(IN2)−$V_{fd}$, or V(IN1)+V(IN2)−2$V_{fd}$. Given worst case conditions, a minimum threshold voltage of 11.4 volts would be present at the cathode of the diode D7 given V(IN1)=V(IN2)=6 and $V_{fd}$=0.3. The minimum threshold voltage stored in the capacitor C6 will then be transferred to the capacitor C11 of the control IC portion 14 through the diode D7. The diode D7 prevents current flow to the positive side of the capacitor C6 from the control IC portion 14. The positive side of the capacitor C11 feeds pin 7 on the IC 18.

The energy stored in the capacitors C11 and C6 must be able to temporarily sustain the IC 18 until the capacitor C1 is charged to approximately nine (9) volts from the 16 volt secondary from the transformer T1. Once this occurs, the transformer T1 has enough voltage at the 16 volt secondary to permanently sustain the input voltage to the IC 18. The diode D4 provides an additional path to the control IC portion 14 through the resistor R11 provided the voltage at V(IN2) is above a nine (9) volt level. The diode D4 prevents current flow from the output portion 16 to second voltage input V(IN2).

Capacitors C2, C3, C4, C5 form a capacitor bank at the output of transformer T1. By changing the number of capacitors in the bank, the proper allowable RMS current and voltage ripple can be provided.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A power supply start up booster circuit for providing an increased start-up voltage for a switch mode control integrated circuit comprising:
    a boost portion for combining a first input voltage that has a predetermined minimum value and a second input voltage that transitions from 0 volts to the predetermined minimum value to make a minimum threshold voltage;
    a control portion having an integrated circuit for using the minimum threshold voltage to temporarily provide a voltage input at said integrated circuit;
    an output portion for providing a permanent voltage input at said integrated circuit and for providing an output supply voltage to a circuit electrically connected to said power supply start up booster circuit; and
    said boost portion including a first capacitor for storing said first input voltage and then adding said first input voltage to said second input voltage once said second input voltage transitions to said predetermined minimum value.

2. A power supply start up booster circuit as set forth in claim 1 wherein said boost means further comprises:
    a first transistor having a collector connecting said first input voltage through said first capacitor and having an emitter connected to ground, said first input voltage charging said first capacitor when said first transistor is in an ON state;
    a second transistor having a base connected to said second input voltage through a first resistor and a collector connected to said base of said first transistor providing a turn ON voltage to a base of said first transistor, said second input voltage replacing floating ground of said first capacitor when said second transistor is in an OFF state.

3. A power supply start up booster circuit as set forth in claim 2 wherein said boost means further comprises:
    a first diode connected between said first input voltage and said first capacitor for preventing current flow to first input voltage from a positive side of said first capacitor;
    a second diode connected between said second input voltage and said first capacitor for preventing current flow from a negative side of said first capacitor to said second input voltage; and
    a third diode connected between said first capacitor and said control means for preventing current flow to the positive side of said first capacitor from said control means.

4. A power supply start up booster circuit as set forth in claim 3 wherein said boost means further comprises a fourth diode connected between said second input voltage and said control means for providing an additional path to charge said control means and to prevent current flow from said control means to said second input voltage.

5. A power supply start up booster circuit as set forth in claim 1 wherein said control means further comprises:
    capacitor means to temporarily sustain said minimum threshold voltage at said input to said integrated circuit until said output means is sufficiently charged to be able to provide said permanent voltage input; and control output voltage means for providing a voltage to said output means.

6. A power supply start up booster circuit as set forth in claim 5 wherein said capacitor means further comprises a second and third capacitor.

7. A power supply start up booster circuit as set forth in claim 6 wherein said control output voltage means further comprises:

a transformer; and a transistor having a gate connected to an output pin of said integrated circuit, a drain connected to said output means, and a source connected to said transformer, said transformer being connected to an input pin of said integrated circuit.

8. A power supply start up booster circuit as set forth in claim 1 wherein said output means further comprises:

a transformer;

power supply means for providing a boosted voltage to an external circuit; and supply means for supplying said permanent voltage to said control means.

9. A power supply start up booster circuit as set forth in claim 8 wherein said power supply means further comprises:

a diode connected between a primary side of said transformer and ground; and a plurality of capacitors connected in parallel with the secondary side of said transformer to hold a charge necessary for the requirements of said external circuit.

10. A power supply start up booster circuit as set forth in claim 1 wherein said control portion further comprises:

capacitor means to temporarily sustain said minimum threshold voltage at said input to said integrated circuit until said output portion is sufficiently charged to be able to provide said permanent voltage input; and control output voltage means for providing a voltage to said output portion.

11. A power supply start up booster circuit as set forth in claim 10 wherein said capacitor means further comprises a second and third capacitor.

12. A power supply start up booster circuit as set forth in claim 10 wherein said control output voltage means further comprises:

a transformer; and a transistor having a gate connected to an output pin of said integrated circuit, a drain connected to said output portion, and a source connected to said transformer, said transformer being connected to an input pin of said integrated circuit.

13. A power supply start up booster circuit as set forth in claim 1 wherein said output portion further comprises:

a transformer;

power supply means for providing a boosted voltage to an external circuit; and supply means for supplying said permanent voltage to said control portion.

14. A power supply start up booster circuit as set forth in claim 13 wherein said power supply means further comprises:

a diode connected between the primary side of said transformer and ground; and a plurality of capacitors connected in parallel with a secondary side of said transformer to hold a charge necessary for the requirements of said external circuit.

15. A power supply start up booster circuit for providing an increased startup voltage for a switch mode control integrated circuit comprising:

a boost portion for combining a first input voltage that has a predetermined minimum value and a second input voltage that transitions from 0 volts to the predetermined minimum value to make a minimum threshold voltage;

a control portion having an integrated circuit for using the minimum threshold voltage to temporarily provide a voltage input at said integrated circuit;

an output portion for providing a permanent voltage input at said integrated circuit and an output supply voltage to an external circuit;

said boost portion comprising a first capacitor for storing said first input voltage and then adding said first input voltage to said second input voltage once said second input voltage transitions to said predetermined minimum value, a first transistor having a collector connecting said first input voltage through said first capacitor and having an emitter connected to ground, said first input voltage charging said first capacitor when said first transistor is in an ON state, a second transistor having a base connected to said second input voltage through a first resistor and a collector connected to said base of said first transistor providing a turn ON voltage to a base of said first transistor, said second input voltage charging said first capacitor when said second transistor is in an OFF state, a first diode connected between said first input voltage and said first capacitor for preventing current flow to first input voltage from a positive side of said first capacitor, a second diode connected between said second input voltage and said first capacitor for preventing current flow from a negative side of said first capacitor to said second input voltage, a third diode connected between said first capacitor and said control portion for preventing current flow to the positive side of said first capacitor from said control portion, and a fourth diode connected between said second input voltage and said control portion for providing an additional path to charge said control portion and to prevent current flow from said controls portion to said second input voltage.

\* \* \* \* \*